OR  3,734,591

United States T30300
Howe

[11] 3,734,591
[45] May 22, 1973

[54] SCANNING ... SCAN RATE AND RAPID RETURN

[75] Inventor: Spencer D. Howe, Los Angeles, Calif.

[73] Assignee: Hughes Aircraft Company, Culver City, Calif.

[22] Filed: Dec. 14, 1970

[21] Appl. No.: 97,641

[52] U.S. Cl. .......................... 350/6, 343/757, 74/97
[51] Int. Cl. .............................................. G02b 17/00
[58] Field of Search ...................... 350/6, 7, 97, 285; 250/234, 235; 178/7.6, 203; 74/96, 97, 86; 248/484; 343/757, 758, 761, 763, 765, 766

[56] References Cited
UNITED STATES PATENTS

| | | | |
|---|---|---|---|
| 1,702,195 | 2/1929 | Centeno | 350/285 |
| 2,599,381 | 6/1952 | Gerks | 343/765 |
| 2,585,579 | 2/1962 | Norden | 74/86 |
| 2,855,521 | 10/1958 | Blackstone | 74/86 | otschka .......................... 350/7

*Primary Examiner*—Ronald L. Wibert
*Assistant Examiner*—Michael J. Tokor
*Attorney*—W. H. MacAllister, Jr. and Lewis B. Sternfels

[57] ABSTRACT

A mirror useful for signal processing and display apparatus is caused to oscillate in a cyclic manner with a uniform scan during 66 percent of a cycle and a quick return during 34 percent of the oscillating cycle. Such uniform scan and quick return is effected by oscillating the mirror on an oscillating frame, the axes of oscillation of both elements being parallel to each other. The mirror is substantially free to pivot with respect to the frame and is provided with springs for periodic contact with the frame at the end of each oscillatory arc for storage of spring energy to drive the mirror. The frame is oscillated in a substantially sinusoidal manner so that energy stored therein during the slower, active portion of the cycle is retransferred by impact to the mirror for the fast retrace thereof.

24 Claims, 16 Drawing Figures

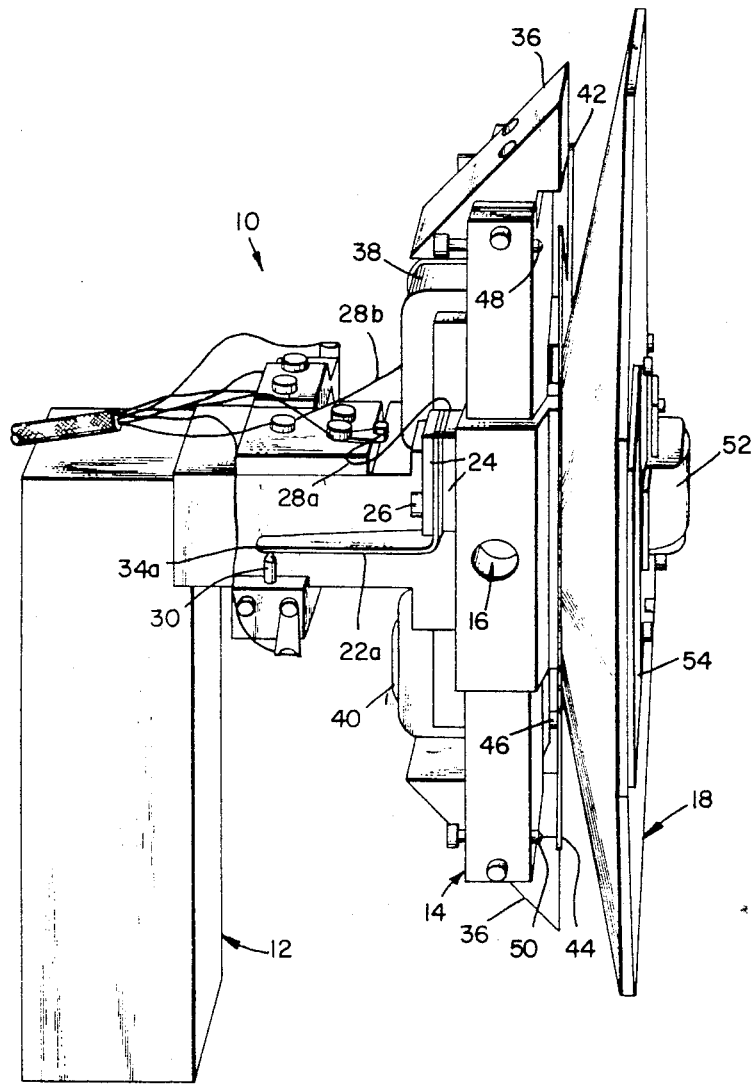
Fig. 1.
Spencer D. Howe,
INVENTOR.
BY.
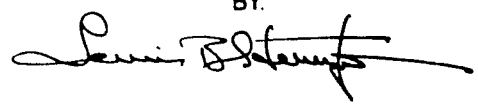
ATTORNEY.

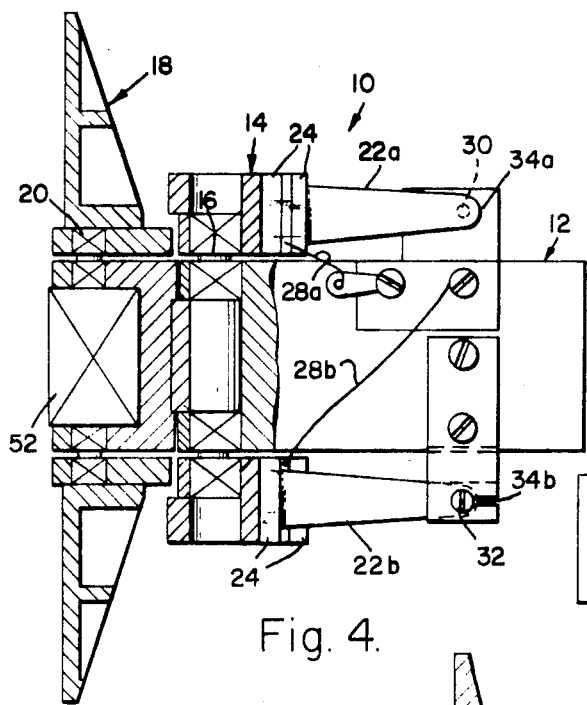
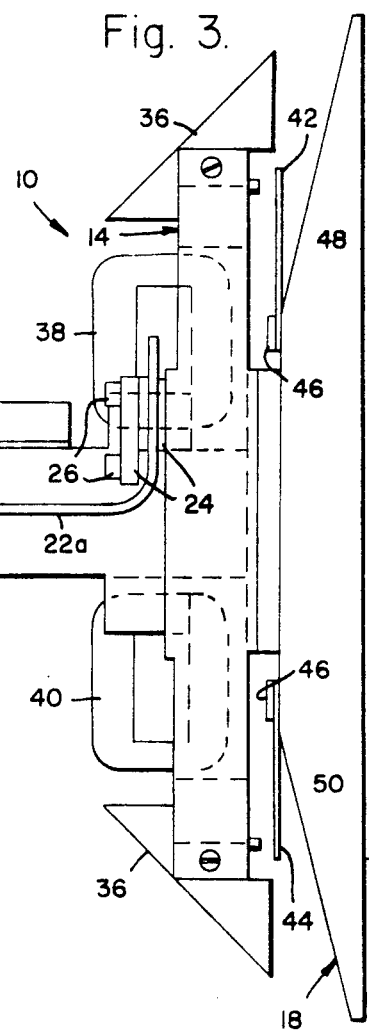
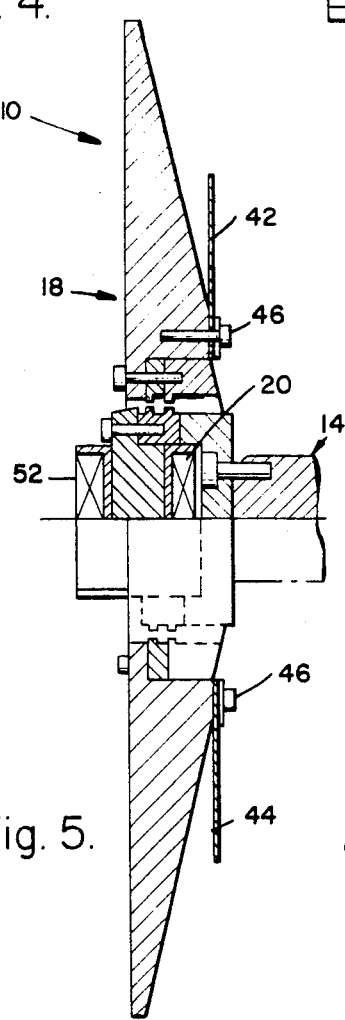
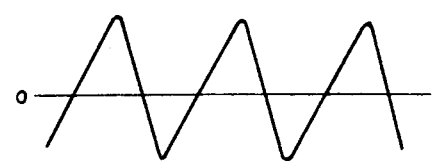

SCANNING SYSTEM WITH UNIFORM SCAN RATE AND RAPID RETURN

The present invention relates to an apparatus for oscillating an element through an arc having a cycle of which approximately 66 percent of the cyclic time is utilized for uniform rate of movement of the element from one terminal point of the arc to the other arc terminal point and a quick return of approximately 34 percent of the cyclic time from the second arc terminal point to the first.

Prior apparatus utilize an element which is bounced back and forth in limit-cycle oscillation between two stiff and relatively separated springs. The total energy in such apparatus is constant, either as kinetic energy in the moving element or as strain-energy in the springs at the instant of turn-around; thus any kind of driver needs only to make up the small amount of energy lost to friction and windage. Such apparatus, for example, as disclosed in U.S. Pat. applications, Ser. No. 56,094, filed June 29, 1970 now U.S. Pat. No. 3,671,766, patented June 20, 1972, entitled Oscillating Mechanism which is a continuation application of Ser. No. 766,699, filed Oct. 11, 1968, now abandoned, and Ser. No. 40,837, filed May 27, 1970 now U.S. Pat. No. 3,678,308, patented July 18, 1972, entitled "Scanning Device," all by Spencer D. Howe, the inventor of the present invention, cause a mirror element to scan at the same rate between its arc terminals. The time-displacement plot for each such device is a triangle wave. When it is desired that the oscillation in one direction be equal to the oscillation in the return direction, these devices operate well.

However, there are many instances where only one-half of the oscillatory cycle is used, the other half functioning solely to return the scanning element to its original position. For such operation, the above-noted prior art devices are 50 percent inefficient.

The present invention relates to an improvement over such prior apparatus wherein the scan rate of the element through one-half its oscillatory cycle is uniform and slower than the rate at which the element returns to its orignal position. In the present invention, the uniform scan rate is maximized at approximately 66 percent of the time of its oscillatory cycle while the return scan rate is approximately 34 percent of the time of the total oscillatory cycle.

This improved result is obtained by pivoting the element to a frame which in turn is pivoted to a support. The element is substantially free to oscillate with respect to the frame and is provided with spring means which are contactable only at the terminal of the arc of oscillation so as to store energy and impel the element in the opposite oscillatory direction. To insure stable operation of the system, the spring means is slightly damped by a multiple leaf spring design, or by permitting a small amount of rubbing engagement upon contact between the frame and the element at the arc terminals, or by utilizing lossy material, such as silicone rubber or neoprene in parallel contact with the spring means. The frame is powered to oscillate in a substantially sinusoidal manner. The frame and the element are pivoted on parallel axes so that both swing and strike each other twice during each complete oscillatory cycle. Energy is stored in the frame during the slower, active portion of the cycle and retransferred by impact to the element for the fast return thereof. Energy is required in the frame only to overcome losses in the resonant system and in the damping. Although the phase and the amplitude of the sinusoidal motion is shifted between two modes with each element impact, the frequency of the frame remains the same.

It is, therefore, an object of the present invention to provide an element having a uniform scan rate and a quick return.

Another object is to provide a greater utilization of the oscillatory cycle.

Other aims and objects as well as a more complete understanding of the present invention will appear from the following explanation of an exemplary embodiment and the accompanying drawings thereof, in which:

FIG. 1 is a perspective view of the scanning system;

FIG. 3 is a side elevational view of the apparatus of FIG. 1 taken along lines 3—3 of FIG. 2;

Figure 2:
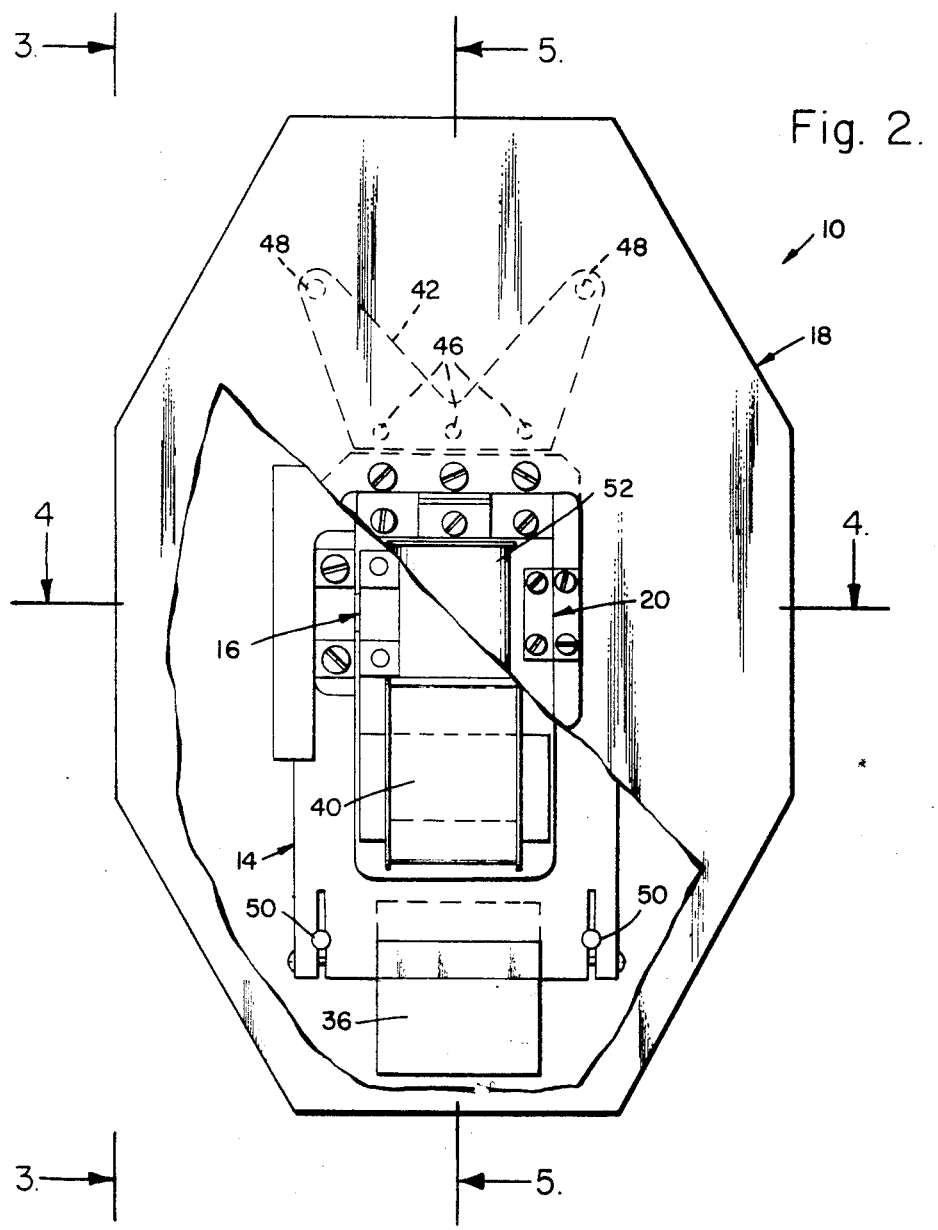
FIG. 2 is a front elevational view of the system depicted in FIG. 1 showing the scanning element thereof with a portion cut away.
Figure 7:
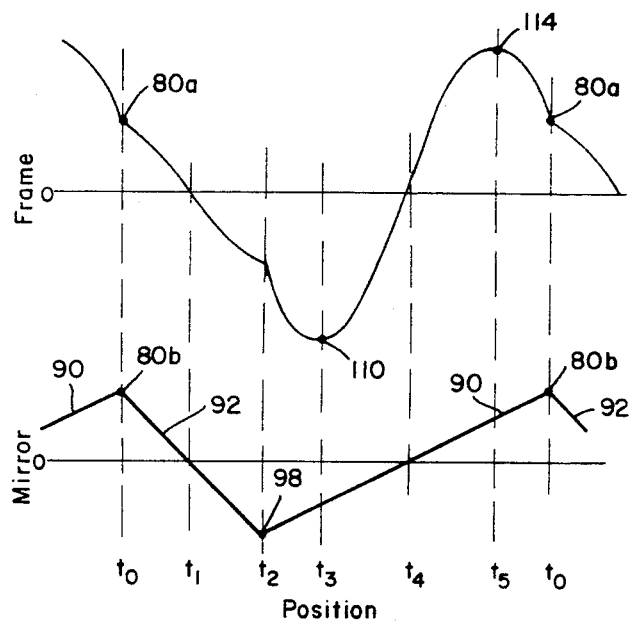
Figure 8:
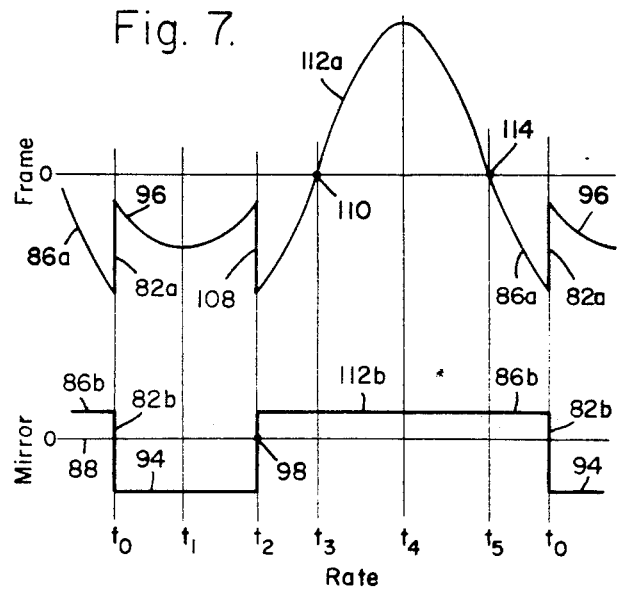
Figure 10:
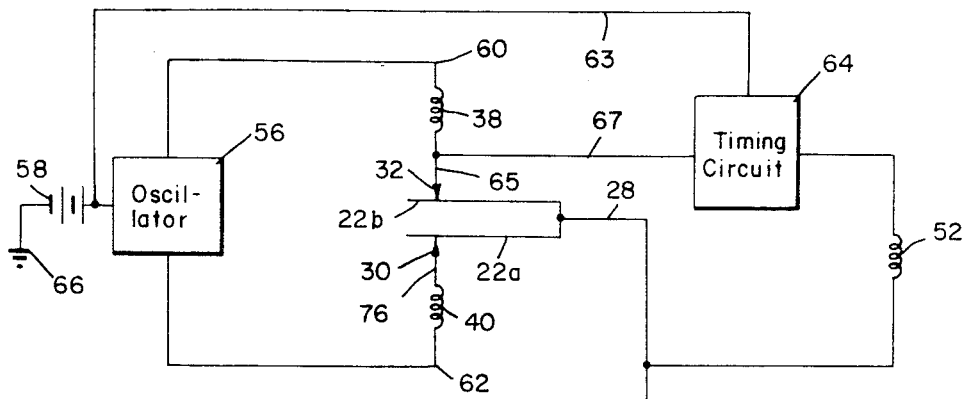

FIGS. 4 and 5 respectively are substantially cross sectional views of the system taken along lines 4—4 and 5—5, respectively, of FIG. 2;

FIGS. 6(a)–(f) are schematic views of the two oscillating parts depicted in FIGS. 1-5 moving through a complete cycle;

FIGS. 7 and 8 respectively depict position and rate plots of the frame and element during one complete cycle thereof, the amplitudes of the curves not necessarily being to the same scale;

FIG. 9 depicts a scan pattern taken of the element, reflected from a mirror attached thereto during a few cycles thereof;

FIG. 10 depicts examplary electrical circuitry in partial block diagram for operating the present invention; and FIGS. 11(a)–(e) depict the voltage and current plots of the driver mechanism for the frame as furnished from an oscillator and as modified by contact breaks, and a current plot of means for predetermining the direction of scan of the element.

Accordingly, with reference to FIGS. 1-5, a scanning device 10 comprises a support 12 which may form part of a vehicle or other means carrying the scanning device, a frame 14 pivotable to the support in a restrained manner, such as by a cross-axis flexure pivot 16 of high spring constant (see FIG. 4), and a mirror assembly 18 pivotably secured to the frame by suitable means, such as by a cross-axis flexure pivot 20 (see also FIG. 4) or by standard bearings. The frame may be of ferromagnetic material in whole or in part in order to provide for driving of the frame as is discussed below.

Secured to frame 14 is a stiff cantilevered beam system, comprising a pair of springs 22a and 22b, each of which is symmetrically affixed to the frame on opposite sides thereof (see FIG. 4) by suitable mounts 24 and secured thereto by means of bolts 26 or the like. Mounts 24 are formed of a dielectric material so that springs 22a and 22b may act additionally as electrical contacts. For this purpose, leads 28a and 28b are secured to the springs and a pair of contacts 30 and 32 are positioned respectively below and above springs 22a and 22b at the free ends 34a and 34b thereof for alternate supply of power as will be described below. Contacts 30 and 32 are of sufficient rigidity so as not to deform upon bending of springs 22a and 22b but are adjustable so as to afford precise positioning with respect to spring ends 34a and 34b.

A pair of weights 36 are secured to frame 14 to give the desired ratio

Inertia of Frame/Inertia of Mirror and to give the desired ratio

Natural frequency of frame/Scan frequency in conjunction with the combined spring instants of springs 22a, 22b, and 16.

A pair of electric coils 38 and 40 are secured to support 12 and are arranged to exert a magnetic attractive force upon frame 14 when either of the coils is energized so as to permit oscillation of the frame.

Attached to mirror assembly 18 are a pair of outwardly projecting cantilever spring arms 42 and 44 which are secured to the mirror assembly by appropriate bolts 46. Spring arms 42 and 44 are adapted to respectively contact adjustable stops 48 and 50 (see FIGS. 1 and 2) at the ends of the arc of oscillation of the mirror assembly. Stops 48 and 50 may be extended from frame 14 at an appropriate distance from spring arms 42 and 44 so as to adjust the length of the arc through which the mirror oscillates. Attached to the assembly is a mirror 54 for purposes of scanning and noting the combined oscillational movements of frame 14 and mirror assembly 18. Since the components of the systems are symmetrically placed, the direction of the scanning or duty stroke is uncontrolled, that is, from stop 48 to 50 or vice-versa. However, it is desirable to ordain the duty stroke direction and, for this purpose, a coil 52 is secured to mirror assembly 18 to which a pulse of electrical power is furnished at a preselected time.

An alternate method of direction-control utilizes two pairs of switching contacts placed on the mirror or element and so arranged as to be both normally closed and to break at about the three-quarter point of the stroke. Each pair is coupled in series with a pair of the frame spring contacts, and the timing is such that the mirror switches clip out a large portion of the drive pulse occurring during retrace, but none of the pulse occurring during scan. One or the other pair of these contacts would be shorted out with a manual selector switch, and the unit would shift to that mode, where one pair of the contacts do no clipping because they are open only just at start of scan, and the other pair of the contacts do no clipping because they are shorted.

Operation of scanning device 10 is accomplished by causing frame 14 to oscillate in a substantially sinusoidal manner, thereby driving mirror assembly 18. Oscillation of the frame may be commenced and maintained by means of the illustrative circuit depicted in FIG. 10 wherein coils 38 and 40 are coupled at their respective ends 60 and 62 to an oscillator 56 and at their other ends respectively to contacts 30 and 32. Oscillator 56 is connected to the positive terminal of a source 58. Mirror coil 52 is coupled between a timing circuit 64 and a ground 66 of the electrical source. The timing circuit is also connected to the positive terminal of source 58 through a lead 63 and to a lead 65 between coil 38 and contact 32 through connection 67. Cantilever springs 22a and 22b are grounded through common lead 28 to ground 66.

Figure 11:
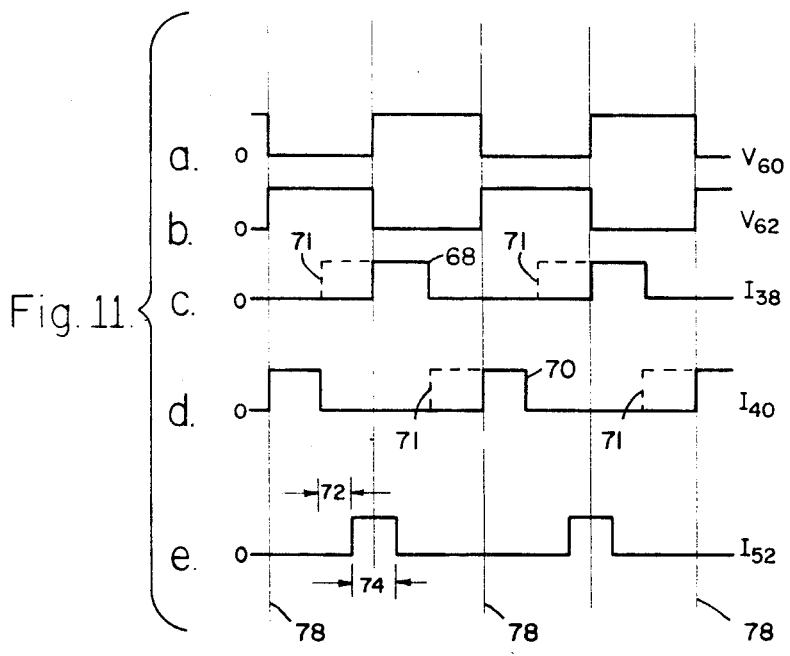

The manner of operation of the circuit illustrated in FIG. 10 may be understood with reference to FIGS. 11(a)–(e). Oscillator 56 produces a voltage signal output to coil 38 through line 60 having the characteristic depicted in FIG. 11(a) and another voltage signal output to coil 40 through line 62 having the characteristic shown in FIG. 11(b). These voltage signals are shown as if the circuits were not broken; however, because oscillation of frame 14 makes and breaks electrical contact between spring 22a and contact 30 and between spring 22b and contact 32, the voltage signal characteristics are modified in a manner similar to that shown in FIGS. 11(c) and 11(d), illustrating the current signal characteristics. In these latter two Figures, contact breaks for coils 38 and 40 respectively occur at points 68 and 70 of FIGS. 11(c) and 11(d), the contact makes having occurred previously at the several times illustrated by dashed lines 71. Since the pulse of current in each coil is initiated by the oscillator, but terminated by arrival of the frame at a preset position, should the frame by reason of some perturbation move too fast, it will terminate the pulse earlier in the cycle, and the system will then receive less energy and will slow down in such a manner as to correct the perturbation.

Timing circuit 64 operates in such a manner to cause current to flow through coil 52 as shown in FIG. 11(e). Here, a preset delay 72 and a preset width 74 of current flow causes coil 52 to be energized in such a manner as to predetermine the duty or scanning stroke of element 18 in the desired oscillatory direction, either from stops 48 to stops 50 or vice-versa. The particular times of current flow and, therefore, the direction of scan, result from the particular connection 67 of timing circuit 64 to lead 65. If, however, connection 67 were secured to lead 76 between coil 40 and contact 30, the current flow would occur at the times indicated by lines 78 of the FIG. 11(e) curve and the direction of scan would be opposite from the abovementioned direction.

Figure 6A:
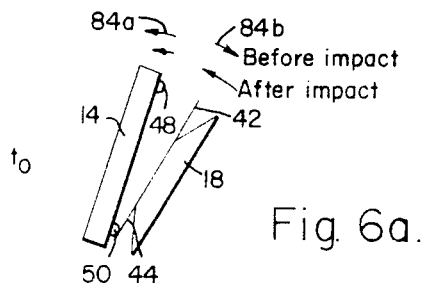
Figure 6B:
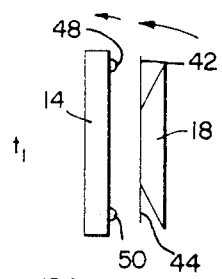

Operation of the scanning device may be understood with reference to FIGS. 6(a)–(f) and the movement sketches of the frame and mirror of FIGS. 7 and 8, wherein times $t_0$ through $t_5$ indicate points of time at which the frame and mirror are positioned. The scanning device is already assumed to have commenced operation. FIGS. 6(a), (b), and (c) depict the 34 percent rapid return of the mirror assembly while FIGS. 6(c), (d), (e), (f) and (a) illustrate the 66 percent uniform scan of assembly 18. The positions and rates of movement of the two elements respectively correspond to times $t_0$, $t_1$ and $t_2$ and to times $t_2$, $t_3$, $t_4$, $t_5$ and $t_0$ of FIGS. 7 and 8. In FIG. 7, the "0" axis lines correspond to maximum rates of motion of the frame and mirror. In FIG. 8, the "0" axis lines correspond to a change in direction of the frame and mirror, i.e., zero rate.

At time $t_0$, illustrated in FIG. 6(a), impact between stop 50 of frame 14 and spring arm 44 of mirror assembly 18, is indicated by points 80a and 80b of FIG. 7 and line segments 82a and 82b of FIG. 8. Before this impact, the frame is moving with relatively large momentum at an increasing rate in a counterclockwise direction while the mirror assembly is moving in a clockwise direction with a lesser momentum, at a constant rate as respectively indicated by the direction and length of arrows 84a and 84b and shown by curve portions 86a and 86b of FIG. 8. Upon impact between stop 50 and spring arm 44, energy is stored in spring arm 44 causing the frame to slow but still move in a counterclockwise direction, as shown by curve portion 82a of FIG. 8, and to cause the mirror assembly to move in an opposite direction at a relatively large momentum, illustrated by the crossing of line segment 82b of the "0" rate line 88 of FIG. 8 and the change in direction of curve portions 90 and 92 about point 80b of FIG. 7. Consequently, immediately after impact at time $t_o$, the mirror assembly is moving at a rate faster than that of the frame, although both are moving in a counterclockwise direction. However, the mirror assembly is moving at a substantially constant rate while the frame is increasing its rate, as depicted by curves 94 and 96 of FIG. 8 prior to time $t_1$. Immediately after time $t_1$, however, the frame slows with respect to the mirror assembly, as shown by the slope of curve 96.

Figure 6C:
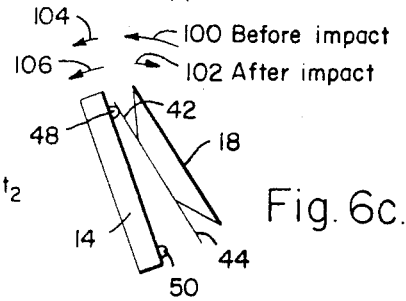

Because the mirror assembly is travelling at a rate faster than the frame, eventually the mirror will contact the frame, at time $t_2$, illustrated in FIG. 6(c), to reverse the direction of assembly motion, shown by points 98 of FIGS. 7 and 8 and by arrows 100 and 102. The frame, however, continues movement in the same direction but with increased speed as shown by arrows 104 and 106 and curve 108 of FIG. 8.

Figure 6D:
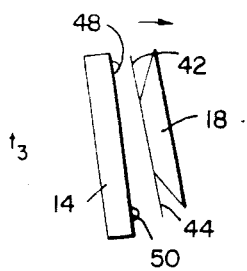
Figure 6E:
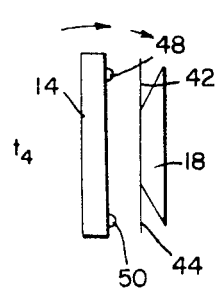
Figure 6F:
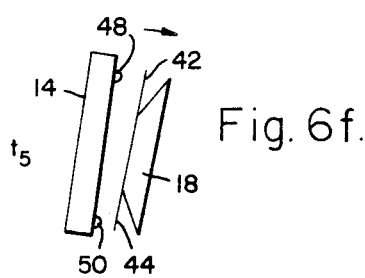

This motion continues until time $t_3$, at which time frame 14 reverses its direction as shown in FIG. 6(d) and as noted by points 110 in FIGS. 7 and 8. The mirror assembly at first moves at a rate faster than that of the frame, then slower, and finally faster, as noted by curve portions 112a and 112b of FIG. 8, encompassing the time passing through time $t_4$ (see also FIG. 6(e)). At time $t_5$, frame 14 reverses direction, as noted in FIGS. 7 and 8 at point 114 to enable movement of spring arm 44 and stop 50 towards each other, as depicted in FIG. 6(f). Contact between arm 44 and stop 50 commences a new cycle with FIG. 6(a).

Scanning of the mirror was photographed as shown in FIG. 9 which illustrates a substantially 66 percent scan rate and a 34 percent return rate.

Although the invention has been described with reference to a particular embodiment thereof, it should be realized that various changes and modifications may be made therein without departing from the spirit and scope of the invention.

What is claimed is:

1. A scanning device comprising:
   a mirror assembly oscillable through a first arc of oscillation bounded by a first pair of arc terminal points about a first axis of oscillation, said mirror assembly having mounting means on the first axis of oscillation;
   a frame oscillable through a second arc of oscillation bounded by a second pair of arc terminal points about a second axis of oscillation parallel to the first axis of oscillation, said frame having
   first journal means pivotally supporting said mirror assembly on said mounting means,
   a first pair of abutments positioned orthogonally to and on opposite sides of the first and second axes of oscillation, and
   spring contact means coupled to a source of electrical power;
   spring means having a pair of cantilever arms of spring material secured to said mirror assembly and positioned orthogonally to and on opposite sides of the first and second axes of oscillation, said arms having portions thereon contactable in sliding engagement with said frame abutments at the mirror arc terminal points and capable of storing energy when stressed;
   a support having second journal means pivotally supporting said frame and a second pair of abutments positioned on opposite sides of said frame spring contact means for contact therewith upon oscillation of said frame; and
   magnetic driver means secured between said support and said frame on opposite sides of the second axis of oscillation for imparting substantially sinusoidal motion of said frame, said driver means comprising
   a first electromagnet positioned on one of said support and said frame and a magnetically attractable portion positioned on the other of said support and said frame at one of the opposite sides, said first electromagnet coupled between the source of electrical power and one of said second pair of abutments and
   a second electromagnet positioned on one of of said support and said frame and a magnetically attractable portion positioned on the other of said support and said frame at the other of the opposite sides, said second electromagnet coupled between the source of electrical power and the other of said second pair of abutments,
   said electromagnets being alternatively energizable upon the alternate contact between said frame spring contact means and said second pair of abutments to impart and continue the substantially sinusoidal motion of said frame whereby the motion thereof causes oscillation of said mirror to rebound between said first pair of abutments upon contact therewith of said spring cantilever arms, the combination of the oscillations of said frame and said mirror providing an approximate 66 percent scan of said mirror in one direction of mirror oscillation and an approximate 34 percent return of said mirror in the opposite direction of mirror oscillation.

2. An oscillating device comprising:
   a frame journalled to a support on first journal means having a first axis for movement of said frame in a first arc of oscillation;
   an element having a journalled coupling to said frame on second journal means having a second axis spaced from and parallel to the first axis for limit-cycle oscillation of said element in a second arc of oscillation bounded by the arc terminal points;
   energy storage and release means coupled to one of said frame and said element and positioned therebetween and having a contact between said frame and said element at the arc terminal points to store and release energy for the limit-cycle oscillation of said element relative to said frame upon the contact therewith between the arc terminal points through a first cycle of oscillation having a first rate of motion during a period of time; and
   force producing means coupled between said frame and said support and operable on said frame to induce the frame movement through a second cycle of oscillation having a second rate of motion different from the first rate during the same period of time.

3. A device as in claim 2 wherein said journalled coupling between said element and said frame comprises spring means.

4. A device as in claim 3 wherein said flexure pivot comprises a cross-axis flexure pivot.

5. A device as in claim 2 wherein said energy storage release means includes a pair of cantilevered arms of spring material positioned on one of said frame and said element and a pair of abutments positioned on the other of said frame and said element and alternately contactable by said arms during the movement of said element with respect to said frame.

6. A device as in claim 2 wherein said force producing means comprises an electromagnetic mechanism having a first part secured to said frame and a second part secured to said support, said first and second parts being positioned at a distance from the first axis and energizable during a portion of the movement of said frame.

7. A device as in claim 2 wherein said energy storage and release means includes damping means to ensure stable oscillation of said element.

8. An oscillating device comprising a support, a first member journalled to said support for oscillation with respect thereto and having abutment means, a second member journalled to said first member for oscillation with respect thereto and having means contactable with said abutment means upon oscillation of said first member, and a driver coupled only between said first member and said support for oscillating said first member, wherein oscillation of said first member causes said abutment means to contact said second member means to oscillate said second member.

9. An oscillating device as in claim 8 wherein said second member means comprises energy storage and release means coupled between said first and second members wherein the oscillation of said first member first stores energy in said energy storage and release means upon contact between said members at said abutment means and wherein the stored energy is released to said second member to oscillate said second member away from said abutment means.

10. An oscillating device as is claim 9 wherein said energy storage and release means comprises a pair of cantilever arms of spring material secured to said second member and extending outwardly on opposite sides of the axis of oscillation of said second member, the outermost portions of said arms adapted to make the contact with said abutment means on said first member.

11. An oscillating device as in claim 9 wherein said energy storage and release means includes damping means to ensure stable oscillation of said second member.

12. An oscillating device as in claim 10 wherein said energy storage and release means includes damping means to ensure stable oscillation of said second member.

13. An oscillating device as in claim 12 wherein the contact of said outermost portions with said abutments include a frictional contact to provide said damping means.

14. An oscillating device as in claim 8 wherein:
said support includes a pair of terminals positioned in the path of the oscillation of said first member to define the ends of the arc of the first member oscillation and
said driver comprises
primary driving means couplable to said first member at said terminals for imparting displacement forces on and momentum to said first member for driving said first member from a first of said terminals toward a second of said terminals and secondary driving means coupled to said first member and acting in conjunction with said primary driving means for overcoming energy losses during oscillation of said first member.

15. An oscillating device as in claim 8 wherein said first member is oscillable through an arc and is alternately contactable with a pair of terminals positioned on said support at the end portions of the arc, and wherein said driver is couplable to said first member upon contact thereof alternately with said terminals and operative upon the contact to impart momentum to said first member for the oscillation thereof from a first of said terminals toward a second of said terminals.

16. A mechanism as in claim 15 wherein said driver includes primary motive means to impart a portion of the momentum to said first member and secondary motive means to overcome energy losses during oscillation of said first member.

17. A mechanism as in claim 16 wherein said primary motive means comprises spring means biasable to store energy therein and to subsequently release energy therefrom to said first member upon the contact thereof alternately with said terminals.

18. A mechanism as in claim 17 wherein said secondary motive means comprises an electromechanical actuator and two pairs of electrical contacts respectively positioned on said first member and on said terminals for alternate energization of said actuator upon the contact of said first member alternatively with said terminals.

19. A mechanism as in claim 18 further including motion impairing means coupled to said driver and said terminals for initiating movement of said first member towards one of said terminals when said first member is at rest.

20. A mechanism as in claim 17 wherein said spring means comprises a cantilever arm secured to said first member and alternatively contactable with said terminals.

21. A mechanism as in claim 16 wherein said secondary motive means comprises a pair of electromechanical actuators respectively energizable upon the contact of said first member alternatively with said terminals, said actuators being positioned respectively on opposite sides of the axis of oscillation of said first member.

22. A mechanism as in claim 21 wherein said driver includes electronic means having a first coupling through a first of said terminals to a first of said actuators, a second coupling through a second of said terminals to a second of said actuators, and a common coupling to said first member.

23. A mechanism as in claim 12 wherein said electronic means includes electrical circuit means so coupled to said actuators as to produce with said primary motive means substantially sinusoidal rate of oscillation of said first member.

24. A mechanism as in claim 23 further including energy storage and release means coupled between said first and second members wherein the substantially sinusoidal rate of oscillation of said first member causes contact with said energy storage and release means for storing energy therein and transferral of the energy to said second member to produce substantially a rate of oscillation of said second member of approximately 66 percent cyclic movement from the first of said terminals to the second of said terminals and of approximately 34 percent cyclic movement from the second of said terminals to the first of said terminals.

* * * * *